Aug. 21, 1923.　　　　　　　　　　　　　　　　　　　　　　1,465,511
C. F. CURREY ET AL
GAS AND LIQUID FUEL BURNER AND IN THE PROCESS OF
BURNING GAS AND LIQUID FUEL
Filed Aug. 2, 1920
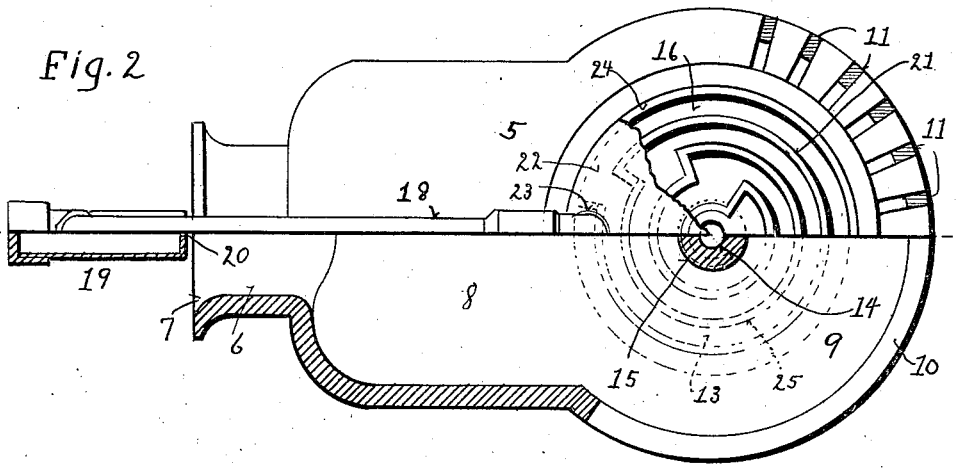
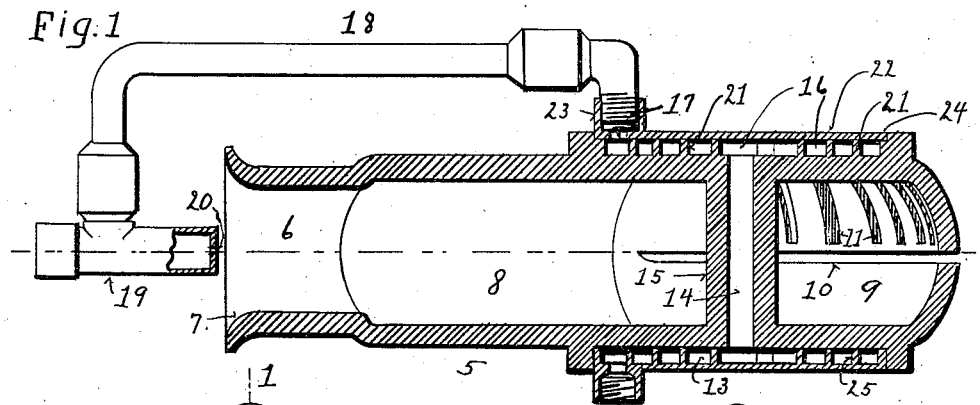
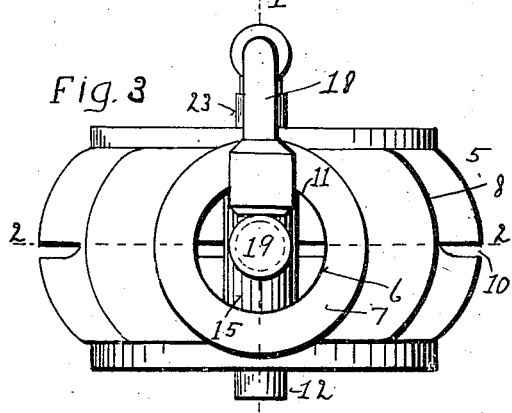
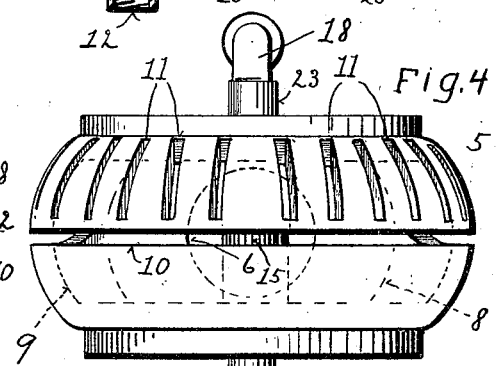

Patented Aug. 21, 1923.

1,465,511

UNITED STATES PATENT OFFICE.

CHARLES FREMONT CURREY AND KENNETH E. LYMAN, OF TOPEKA, KANSAS.

GAS AND LIQUID-FUEL BURNER AND IN THE PROCESS OF BURNING GAS AND LIQUID FUEL.

Application filed August 2, 1920. Serial No. 400,723.

*To all whom it may concern:*

Be it known that we, CHARLES FREMONT CURREY and KENNETH E. LYMAN, citizens of the United States, residing at Topeka, in the county of Shawnee and State of Kansas, have invented certain new and useful Improvements in Gas and Liquid-Fuel Burners and in the Process of Burning Gas and Liquid-Fuel, of which the following is a specification.

Our invention relates to burners providing for the converting of liquid fuel supplied under pressure into vapor or gas, for mixing the vapor or gas with air, and for burning the mixture to supply heat for any useful purpose. It will lead to a better understanding of the objects of our invention to state at the outset that this burning is designed particularly, though not exclusively, for steam automotive purposes; and that its purpose is to provide for the use of the lower and cheaper grades of liquid fuel, such as common kerosene.

Burners of this general nature may, for purposes of the better understanding of our invention, be divided into two classes: first, those having no mixing chamber and in which the vapor is discharged from the vaporizer into the combustion chamber or place, and the mixing effected with the atmosphere therein; and, second, those in which the vapor is discharged into a mixing chamber where it is mixed with air and from which it passes through a gauze or perforated or slotted plate or screen, on the other side of which the combustion takes place, the gauze or plate or screen serving as a heat-diffusing plate or partition to prevent back-firing into the mixing chamber. In the first class of cases, the combustion is not perfect unless additional means, usually an air blast or relatively high pressure on the fuel supply be furnished for effecting a more perfect mixing than that effected by merely forcing a jet of gas or vapor into the air. In the second class of cases, besides requiring a high pressure there is the frequent occurrence of back-firing into the mixing chamber.

General objects of our invention are to produce an efficient, simple, compact, light and durable burner of this kind that is capable of producing a heat that is intense and compact and capable of fluctuating both slowly and quickly from any degree of heat to any other between any of the extreme stages required; to provide a mixing chamber in which initial combustion takes place to perfect the mixing and to vaporize the liquid fuel and superheat it and the gases; to provide in a burner of this kind a semi-enclosed mixing chamber in which initial combustion takes place and which is provided with a slotted wall through which the burning gases pass and which slotted wall is a non-heat-diffusing wall; to avoid the detrimental effect of back firing in burners having a semi-enclosed mixing chamber by providing for the continuous beneficial combustion in the mixing chamber; to improve the process of burning liquid fuel and gas; and to provide certain parts, improvements, combinations, processes and methods hereinafter set forth and claimed.

Our invention comprises a burner of this general nature formed with a mixing chamber with an intake opening and outlet slots, said outlet slots being formed in a non-heat-diffusing wall. It further comprises such a burner with a vaporizer formed in its wall where the liquid fuel is vaporized by the heat from combustion in the mixing chamber. It further comprises such a burner with a semi-enclosed mixing chamber having a slotted non-heat-diffusing wall through which the flames pass. It further comprises such a burner with a vaporizer formed in its wall and a nozzle communicating with the vaporizer and discharging the vapor or gas into the mixing chamber and adapted to carry air thereinto therewith, the burner being formed with such mixing chamber having a retarding non-heat-diffusing slotted wall, so that combustion occurs within the mixing chamber and through and outside the slots; it further comprises the herein described process of burning gas and liquid fuel; and it further comprises the parts, improvements, combinations and processes hereinafter set forth and claimed.

In the drawings accompanying and forming part of this specification and in the description of the drawings, we have shown our invention in its preferred form and what we deem to be the best mode of applying the principles thereof and of using and working the processes therein involved; and it is to be understood that, within the scope of the appended claims, we contemplate changes in form, proportions and materials, the transposition of parts and the substitution of equivalent members, without departing from the spirit of our invention.

Fig. 1 is a vertical central longitudinal sectional elevation of a burner made in accordance with the principles of our invention, the plane of the section being indicated by the line 1—1 in Fig. 3. Fig. 2 is a plan, the lower half being in sectional plan on a plane indicated by the line 2—2 in Fig. 3, and a portion of the top plate being broken away to disclose the passages forming the vaporizer. Figs. 3 and 4 are views of opposite ends respectively.

Similar reference characters indicate like or corresponding parts throughout the several views.

The burner is made of a cast metal casing 5 formed with a mixing chamber 8, 9 and at one end with a round neck 6 which forms the intake for vapor or gas and air, the outer rim being rounded off as shown at 7. The portion of the mixing chamber 8 immediately adjacent to the intake is oblong in cross section, the narrower dimension being slightly greater than the diameter of the neck. The continued or terminal portion of the mixing chamber opposite the intake is of substantially the same corresponding smaller dimension and is round as to its corresponding larger dimension and its diameter is slightly greater than the longer dimension of the first-named portion of the mixing chamber, as shown at 9. A slot 10 is formed in the middle of the rim of the rounded portion, extending substantially all the way around the end opposite the intake and between the walls of the first-named portion. This slot divides the rounded portion horizontally into halves. The lower half is imperforate, and in the upper half are formed a series of vertically disposed slots 11, 11 at the end of the burner opposite the intake end. These slots, in the aggregate, are relatively small with relation to the capacity of the mixing chamber, and relatively large with relation to the intake, a certain balanced relation being required as will hereinafter be explained. A boss is formed on the under side of the casing as shown at 12 and is internally screw-threaded to receive a supply pipe to supply the liquid fuel at a suitable pressure. The liquid fuel thus supplied passes through the vaporizer comprising the sinuous spirally arranged passage 13 in the bottom wall of the casing, the hole 14 through the stay post 15 and the sinuous spirally arranged passage 16 in the top wall, and thence through the port 17 and pipe 18 to the nozzle 19, from which, through the hole 20, it is discharged into the neck and mixing chamber.

To facilitate the manufacture with the small passages of the vaporizer, the rib 21 is cast with the main portion of the casing, and the plate 22 with the boss 23 is cast separately and welded to the main casing around its rim or seam 24; and the rib 25 in the bottom wall is cast with the bottom plate with its boss 12 and said plate welded to the main casing around its rim. By thus forming the ribs integrally with the bottoms of the respective passages, assurance is had that the initial flow of liquid will be along the sinuous passages, thus facilitating the initial vaporization. After the burner has become thoroughly heated for working purposes the escape of a small portion of the vapor or gas across the rib to make a short cut in its passage will not be material.

The operation of our burner is as follows, suitable connection being made for supplying liquid fuel to the inlet 12 at suitable pressure, say ten pounds: The burner is first heated by any suitable means to a temperature sufficient to vaporize liquid fuel passing through the vaporizer; this being done in any manner well known in this general class of burners, or it may be done by an atomizer attached to the nozzle as an auxiliary. The fuel being then admitted into the inlet flows through the vaporizer where it is converted into vapor and passes out through the nozzle and into the neck and mixing chamber, carrying with it air from the adjacent atmosphere into the neck and mixing chamber. It is undertsoood that the mere forcing of the jet of vapor into the mixing chamber through the neck, carrying the air with it, would cause some mixing of the vapor with the air, in which respect our burner would be similar to many others. But, in addition to this mixing by the commingling motion of the vapor and currents, the mixture is ignited in the mixing chamber, and combustion takes place therein continuously while the burner is lighted. This combustion in the mixing chamber serves at least three purposes: First, it heats the vaporizer; second, it causes such intense agitation within the mixing chamber as to secure the best possible mixing of the air, vapor and gases therein that are not burned or that are partly burned as well as those that are being burned therein; and, third, it raises the mixture, both the burned and partially burned contents of the chamber to the highest possible degree of heat, so that the finished combustion which occurs outside the chamber is most complete and the heat produced most intense. Whenever the pressure is turned low enough, all the combustion that occurs takes place within the mixing chamber, but this is sufficient to keep the vaporizer intensely hot so as to instantly respond to the largest supply of fuel to which the burner is adapted and instantly vaporize or gasify it. And it may be here stated that with our burner when the burner and particularly the vaporizer have been sufficiently heated, either by the starting heat or by its own combustion, the whitish vapor becomes an invisible gas. Now, as the pressure is turned on, the mixture in the process of combustion is discharged through the slots and beyond them, and it is this space or area outside the slots that corresponds with the combustion chamber or combustion place which is to be applied to heating purposes. The combustion which takes place through and beyond the slots is short snappy intensely hot flames. The color, when using common kerosene at a pressure of ten pounds to the square inch in a burner of about the proportions and shape shown in the drawings with neck two inches in diameter, slots three-sixteenths inch wide and a one-sixteenth nozzle discharge, varies from pale blue, violet and orange in the mixing chamber to orange and white outside.

Primarily the purpose of the mixing chamber is to mix the vapor and gas and air and prepare it for final and complete combustion when discharged through the slots; and this mixing and preparation comprises the commingling currents caused by the jet projected thereinto as heretofore explained, and the agitation and superheating resulting from the initial combustion, as hereinbefore described. The heating of the vaporizer by any particular means is not important so long as it is properly heated, so far as this new method of combustion is concerned, as it might be heated by the outside flame if the large fire were to be maintained at all times; but in connection with the purposes to which the burner is adapted requiring a fluctuating heat, varying from the most extreme heat down to almost a mere pilot light, and calling for instant fluctuations even between extremes, the use of the combustion within the mixing chamber for heating the vaporizer also becomes of primary importance. The utilizable heat is furnished primarily by the flame that is discharged through and beyond the slots. It will be understood, however, that heat passing from the mixing chamber will also contribute to the utilizable heat and that heat generated by combustion within and beyond the slots will also contribute to the heating of the vaporizer.

Our burner differs from others in this particular, that the back-firing in the mixing chamber is a continuous and beneficial function. Thus, if, the fire having been turned out and the vaporizer properly heated, when the fuel is turned on and a light applied to the flow of mixture discharging through the slots, the flame will instantly follow the flame back through the slots and mixing chamber to as near the nozzle as the necessary oxygen will mix, which in this case is approximately at the inner end of the neck, and will continue to burn from that point through the mixing chamber and through and beyond the slots according to the pressure under which the gas is forced into the intake, which, of course, corresponds with the pressure of the supplied fuel. There is no "jumping" of the flame from one side of the slotted wall to the other nor through the slots while the combustion is processing. The slotted wall does not function as a heat diffuser to prevent back firing, but it does function as a retarding non-heat-diffusing wall.

As a retarding wall it functions as part of the semi-enclosed mixing chamber to retard the gases and vapor while being acted upon to mix and heat them as hereinbefore explained in order not to function as a heat diffuser the wall should have slots not less than approximately three-sixteenths of an inch wide properly spaced apart and arranged so that the wall may efficiently serve to retard. They must be larger in aggregate extent than the area of the intake so as to permit injection of the gas from the nozzle into the neck carrying a proper amount of air with it. On the other hand they must not be too large either individually in width or in aggregate extent as too large openings would permit the contents of the mixing chamber to pass through too directly and without proper preparation for final combustion and without being retarded sufficiently to subject them to the actions hereinbefore described. Allowance must also be made in arranging the openings and chamber for the enormous expansion caused by the combustion within the mixing chamber. Should the slots be too large, the burner would function as an ordinary torch or the burners comprising the first class of burners mentioned in the third paragraph of this specification. It would then cease to have a semi-enclosed mixing chamber and retarding wall, in the sense in which those terms are used and explained in this specification.

Necessarily in explaining the principles of our burner and the operation of it, we have also explained the working of the novel process in the burning of the gas and liquid fuel. In this process we effect the mixing not only by the commingling currents within the semi-enclosed mixing chamber but also by the initial combustion therein and use for outside heating purposes the heat generated by the continuous combustion of the burning mass as it is discharged from such chamber; and we also utilize the initial mixing combustion for heating the fuel and converting it into a vapor or gas.

Having thus described our invention, what we claim is:

1. A liquid fuel and gas burner comprising the combination of a casing formed with a mixing chamber having at one end a round intake and being oblong in cross section, the less diameter being slightly larger than the diameter of the intake, and the end opposite the intake being rounded the greater diameter of said chamber and having a slot around the middle of its periphery and also having a series of vertical slots above said middle slot, said casing being also formed with sinuous spirally arranged vaporizing passages in its top and bottom walls adjacent said slotted end with a hollow post connecting said passages through said chamber, and a nozzle communicating with said passages and arranged to discharge into said chamber through said intake and said nozzle and said intake being arranged to admit air into said chamber along with the discharge from the nozzle; said mixing chamber being also adapted for initial combustion of the combustible elements therein and said end wall being a retarding wall and said slots being adapted for the discharge therethrough of the mass of said elements during the process of combustion.

2. A burner comprising the combination of a casing formed with a semi-enclosed mixing chamber having at one end a round intake hole and at the other end a rounded retarding slotted wall, said slots being in the aggregate larger than the intake and small with relation to the capacity of the chamber, and also formed with a vaporizing passage in the upper and lower walls of said chamber, and a nozzle communicating with said vaporizer and adapted to discharge into said chamber through the intake and said nozzle and said intake being arranged to admit air into said chamber along with the discharge from the nozzle; said chamber being adapted for initial combustion therein and said retarding slotted wall being adapted for the discharge therethrough of the mass from within the chamber during the process of combustion.

3. In a gas burner, a casing comprising a semi-enclosed mixing chamber having an intake passage at one end and provided at its opposite with a retarding wall or baffle, said wall having a horizontal slit dividing it into upper and lower sections, and one of said sections provided with vertically disposed slots therethrough, said chamber being adapted for combustion therein and said retarding wall being adapted to discharge the burning mass from within said chamber.

4. In a gas burner, a casing formed with a semi-enclosed mixing chamber having an intake at one end and a rounded retarding slotted wall at its opposite end, said chamber being adapted for combustion therein and said wall being adapted for the discharge therethrough of the mass from within during the process of combustion.

5. A liquid fuel and gas burner comprising the combination of a casing formed with a semi-enclosed mixing chamber adapted for combustion therein and having an intake and a retarding slotted wall adapted for the discharge therethrough of the mass from within said chamber during the process of combustion, and said casing being also formed with a vaporizing passage in its upper and lower walls adapted to be heated by the combustion within said chamber, and a nozzle communicating with said vaporizer and arranged to discharge into said chamber through said intake and to carry air thereinto along with such discharge.

6. In a gas burner, a casing comprising a semi-enclosed mixing and combustion chamber, said chamber having an air vapor inlet at one end and a rounded retarding but non-diffusing wall at the opposite end, said wall provided with a horizontal slot in alinement with the air and vapor inlet, said slot adapted to discharge from within the chamber and permit complete combustion exteriorly of the casing.

7. A liquid fuel and gas burner comprising in combination a casing formed with a semi-enclosed mixing chamber adapted for combustion therein, and having an intake at one end and a retarding, non-heat-diffusing slotted wall diametrically opposite said intake, and adapted for the discharge therethrough of the burning mass from within the mixing chamber, and said casing being also formed with sinuous vaporizing passages in its upper and lower walls and a passage extending vertically through said chamber and connecting said upper and lower vaporizing passages, and an exterior nozzle adapted to discharge into said mixing chamber through its intake and to carry air into said chamber with such discharge.

CHARLES FREMONT CURREY.
KENNETH E. LYMAN.